US010080073B2

(12) United States Patent
Levinsohn

(10) Patent No.: US 10,080,073 B2
(45) Date of Patent: *Sep. 18, 2018

(54) MICROPHONE ACCESSORY AND METHOD OF USING A MICROPHONE

(71) Applicant: Steven Mark Levinsohn, Los Angeles, CA (US)

(72) Inventor: Steven Mark Levinsohn, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/372,162

(22) Filed: Dec. 7, 2016

(65) Prior Publication Data

US 2017/0094383 A1 Mar. 30, 2017

Related U.S. Application Data

(63) Continuation of application No. 14/476,995, filed on Sep. 4, 2014, now Pat. No. 9,521,477.

(30) Foreign Application Priority Data

Sep. 4, 2013 (ZA) .................. 2013/06626
Sep. 3, 2014 (ZA) .................. 2014/06466

(51) Int. Cl.
  H04R 9/08 (2006.01)
  H04R 1/08 (2006.01)
  G06F 1/16 (2006.01)
(52) U.S. Cl.
  CPC ............ H04R 1/08 (2013.01); G06F 1/1637 (2013.01); *H04R 2499/15* (2013.01)

(58) Field of Classification Search
  CPC ........ G09F 27/00; H04R 1/08; H04R 2499/15
  See application file for complete search history.

(56) References Cited

U.S. PATENT DOCUMENTS

| 3,746,356 A | 7/1973 | Shipstad |
| 5,303,109 A | 4/1994 | Takao |
| 5,598,162 A * | 1/1997 | Terashima ........... G10H 1/0083 181/179 |
| 6,186,909 B1 | 2/2001 | Swanson, Jr. |

(Continued)

FOREIGN PATENT DOCUMENTS

| GB | 2439405 A * | 12/2007 | ............. G11B 31/00 |
| GB | 2439405 A | 12/2007 | |

(Continued)

*Primary Examiner* — Matthew Eason
*Assistant Examiner* — Ryan Robinson

(57) ABSTRACT

This invention relates to microphone accessories for use with a hand-held microphone, and to a method of using a microphone. The microphone accessory in accordance with the invention has a body comprising an attachment formation for attaching the microphone accessory to the handle of the microphone, a holding portion to be engaged by a hand of the user, a cover portion coupled to the holding portion and substantially spaced therefrom so as to define a holding zone between the holding portion and the cover portion for receipt of the hand of the user to engage the holding portion, in use, wherein the cover portion substantially shields or covers the holding zone and/or the hand of the user; and a static non-electronically variable display device and/or an electronically variable display device. The invention also relates to a wearable microphone accessory.

20 Claims, 13 Drawing Sheets

(56) References Cited

U.S. PATENT DOCUMENTS

| | | | | |
|---|---|---|---|---|
| 7,103,318 | B2* | 9/2006 | Levinsohn | G09F 19/00 |
| | | | | 455/41.2 |
| 8,128,809 | B2 | 3/2012 | Wellach et al. | |
| 8,218,809 | B2* | 7/2012 | Wilson | H04R 1/08 |
| | | | | 381/388 |
| 9,113,116 | B1* | 8/2015 | Al-Saffar | H04N 5/645 |
| 9,521,477 | B2* | 12/2016 | Levinsohn | G09F 23/00 |
| 2007/0210926 | A1* | 9/2007 | Chavez | G08B 1/08 |
| | | | | 340/573.1 |
| 2008/0260194 | A1* | 10/2008 | Pooley | H04R 1/06 |
| | | | | 381/361 |
| 2012/0004923 | A2* | 1/2012 | Gaines | G06Q 30/02 |
| | | | | 705/1.1 |
| 2013/0308796 | A1* | 11/2013 | Levinsohn | H04R 1/04 |
| | | | | 381/122 |
| 2014/0270265 | A1* | 9/2014 | Richison | H04R 1/04 |
| | | | | 381/122 |
| 2014/0361025 | A1 | 12/2014 | Gastelum et al. | |
| 2015/0124996 | A1* | 5/2015 | Levinsohn | H04R 1/08 |
| | | | | 381/91 |
| 2017/0191615 | A1* | 7/2017 | Goldstein | F16M 13/04 |

FOREIGN PATENT DOCUMENTS

| | | | | |
|---|---|---|---|---|
| JP | 2007259444 A | * | 10/2007 | |
| WO | WO 2005093698 A2 | * | 10/2005 | G09F 7/10 |
| WO | WO 2015135004 A2 | * | 9/2015 | H04R 1/083 |

* cited by examiner

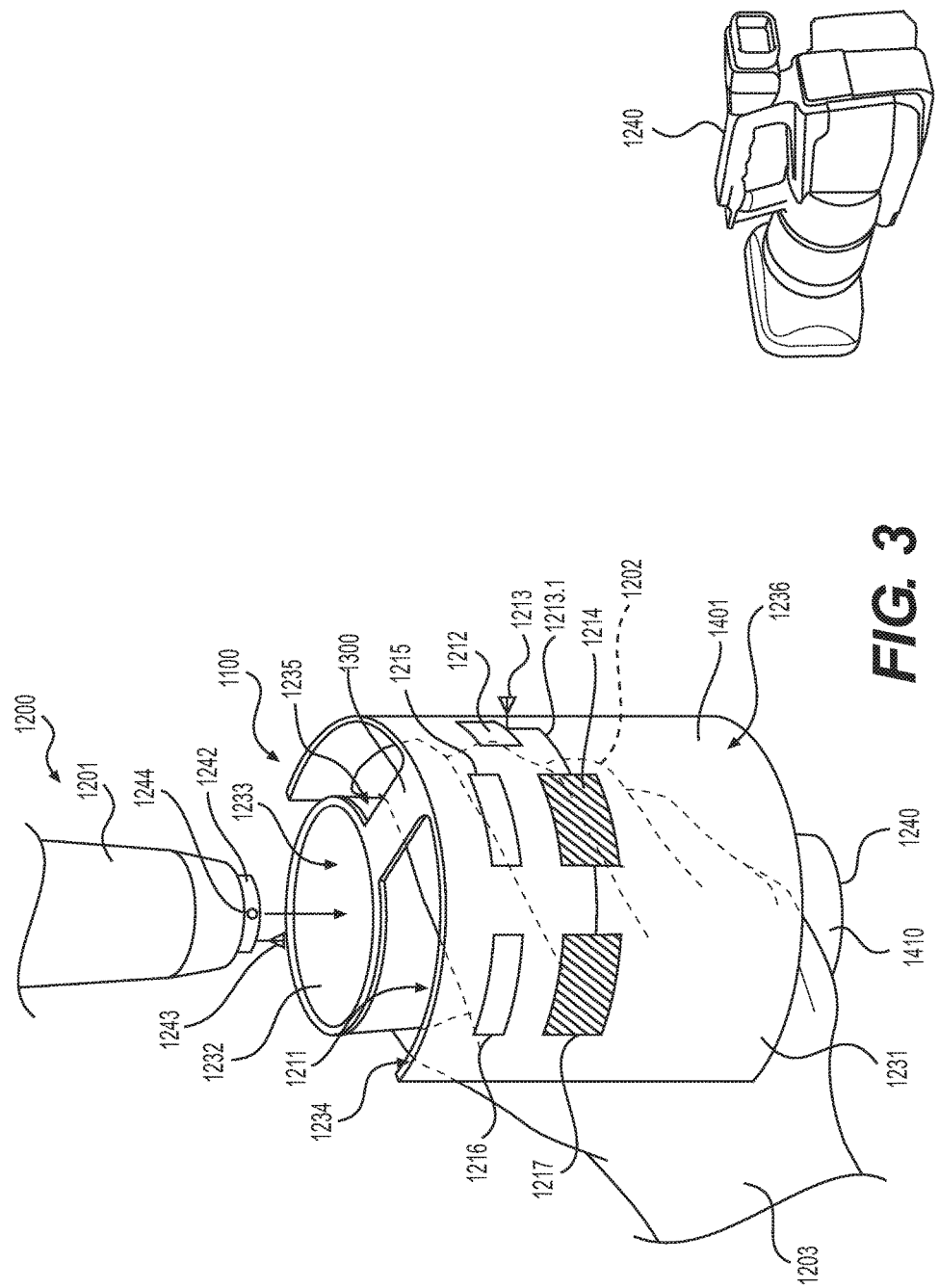

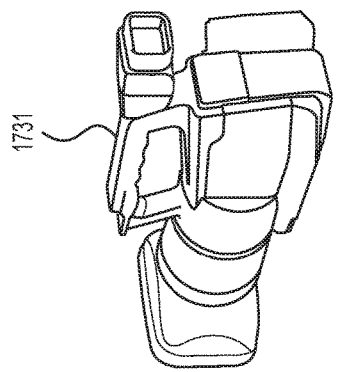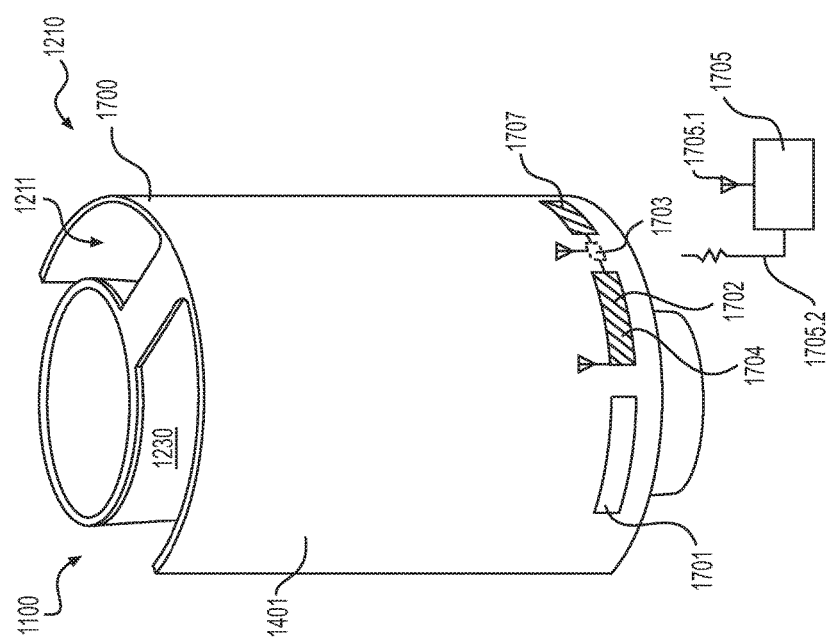
FIG. 6

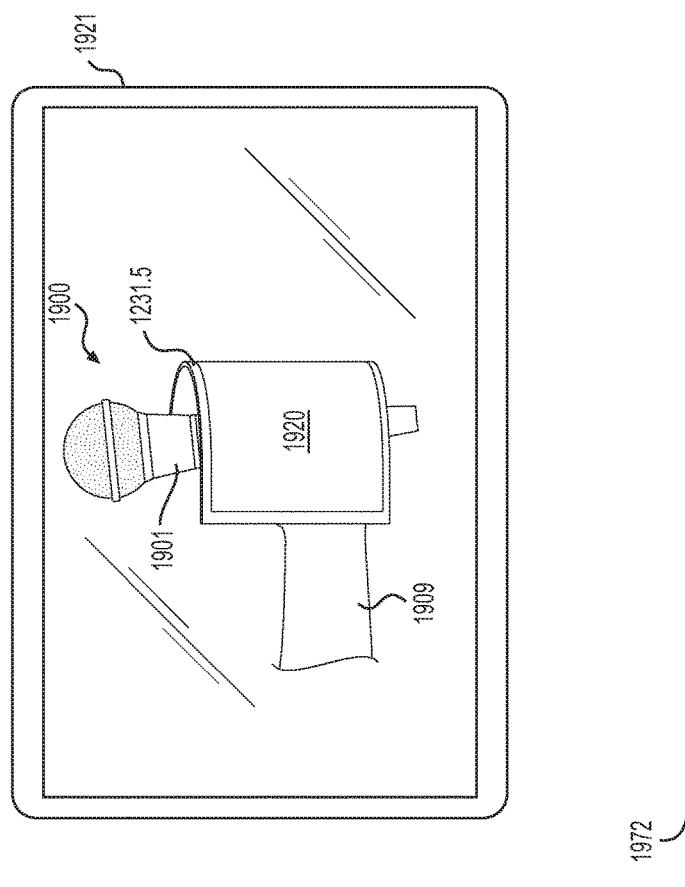
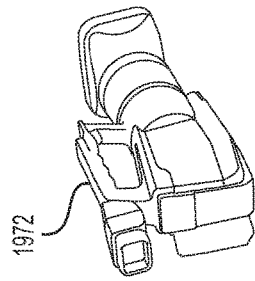
FIG. 16
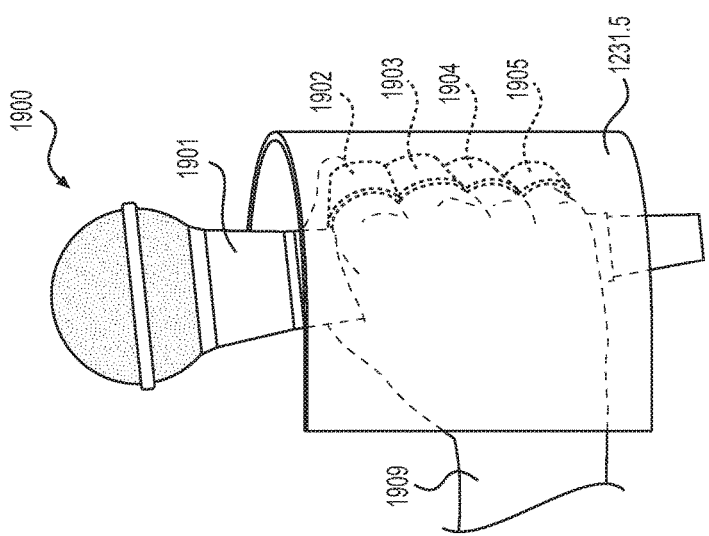
FIG. 15

MICROPHONE ACCESSORY AND METHOD OF USING A MICROPHONE

FIELD OF THE INVENTION

The invention relates generally to microphone accessories and methods of using microphones, particularly microphones which are used for audio pickup during television broadcasts, or the like.

BACKGROUND OF THE INVENTION

A conventional microphone typically comprises at least a head enclosing a suitable audio transducer, and an elongate handle or stem or stalk extending from the microphone head about a longitudinal axis of the microphone.

For purposes of providing messages to audiences, for example, for advertising purposes, or like, cuboidal microphone flags having one or more display panels displaying static printed media, or in some example embodiments electronically variable data, are typically provided in a collar fashion adjacent a junction of the handle and the head of the microphone. In particular, many microphone flags comprise central bores in which handles of microphones are slidably receivable such that the handles protrude therefrom. In this way, a message is communicated to an audience by way of the microphone flag whilst a presenter is able to handle the microphone conventionally via the handle thereof, in use.

However, it will be appreciated that conventional microphone flags have a limitation in that the flag has to be of a particular configuration so as to provide advertising data but also enable conventional handling of the microphone. As many broadcasters charge for advertisements displayed via the microphone flags, the resultant effect is that a broadcaster of a filmed microphone with a conventional microphone flag operatively attached thereto may be not necessarily be able to obtain maximum possible revenue for such use of the microphone with a microphone flag of the type described herein operatively attached thereto.

SUMMARY OF INVENTION

According to one aspect of the invention, there is provided a microphone accessory for use with a microphone comprising a head and a handle extending from the head, the microphone accessory having a body comprising:
  an attachment formation for attaching the microphone accessory to the handle of the microphone, in use;
  a cover portion coupled to the attachment formation, wherein with the accessory attached to the microphone handle by way of the attachment formation, in use, the cover portion substantially shields or covers the hand of the user; and
  at least one display and/or display device for displaying at least one communication selected from a group comprising a static display, an electronic display device, a holographic display device, and a projected display device, attached or removably attachable to the cover portion.

The attachment formation may comprise a clip, for example, and O-ring clip to attach the accessory to the microphone handle, and a spacer to space the cover portion from the clip. In this way, there is a holding zone or clearance between the microphone handle and the cover portion, to an extent determined by the spacer, when the accessory is attached to the microphone handle, in use.

The microphone accessory may comprise a holding portion engageable by a hand of a user, in use, wherein the cover portion is coupled to the holding portion and is substantially spaced therefrom so as to define a holding zone between the holding portion and the cover portion for receipt of the hand of the user to engage the holding portion, in use, such that the cover portion substantially shields or covers the holding zone and/or the hand of the user engaging the holding portion.

The attachment formation may be in the form of a receiving slot or passage located in the holding portion for receiving the microphone handle axially therein wherein the receiving slot or passage is shaped and/or dimensioned to receive the handle of the microphone axially therein.

The holding portion may define the attachment formation, in the form of a receiving slot of substantially cylindrical volume, axially therein in which the microphone handle is receivable, and wherein the cover portion is in the form of a sheet-like member having a first end attached or removably attachable to the holding portion along the length thereof and a second free end, and wherein the cover portion extends in a substantially curved or co-axial fashion to the holding portion and spaced therefrom so as to define the holding zone therebetween.

The cover portion may be in the form of a two or three-dimensional shape, and/or wherein the cover portion is in the form of or comprises a flat or curved display screen extending substantially for a majority of an operative outer surface of the cover portion.

The accessory may comprise flag engaging formations so as to be removably attachable to a microphone flag.

The holding portion may have a shape selected from the group comprising at least one of cylindrical, round, rounded, tapered, tubular, and rod-shaped, and the cover portion is in the form of a member being selected from the group comprising at least one of curved, deformable, reformable, planar, substantially planar, rounded, bendable, flexible, and/or rigid, semi-rigid, attached or removably attachable to the holding portion by one or more attaching members, wherein the attaching members space the cover portion from the holding portion thereby to define the holding zone therebetween.

The cover portion may extend substantially the length of the holding portion and may have a width selected so as to substantially cover the holding zone and/or the hand of the user, in use.

The attachment formation may comprise a connection passage so as to receive suitable wiring connectable to the microphone handle.

The microphone accessory may comprise engaging formations in the holding zone to facilitate the hand of the user engaging the holding portion.

The microphone accessory may further comprise:
  a power supply;
  a data storage device storing electronically variable media for display by the electronically variable display device and/or the holographic display device and/or the projected display device; and
  a processor configured to control the electronically variable display device to display electronically variable media stored in the data storage device.

The accessory may comprise a wireless communication module configured to receive wireless signals indicative of electronically variable media, wherein the processor is configured to control the electronically variable display device/s to display electronically variable media received wirelessly via the wireless communication module.

According to another aspect of the invention, there is provided a method of using a microphone, comprising a head and a handle extending from the head, the method comprising displaying at least one communication via a device selected from a group comprising a static display, an electronic display device, a holographic display device, and a projected display device attached or removably attachable to the cover portion of the microphone accessory attachable to the handle of the microphone by way of an attachment formation coupled to the cover portion, wherein the cover portion substantially shields or covers a hand of the user, in use.

The microphone accessory may comprise a holding portion to be engaged by a hand of a user, in use, and wherein the cover portion is coupled to the holding portion and substantially spaced therefrom so as to define a holding zone between the holding portion and the cover portion for receipt of the hand of the user to engage the holding portion, in use such that the cover portion substantially shields or covers the hand of the user.

The attachment formation may be in the form of a receiving slot or passage located in the holding portion for receiving the microphone handle axially therein, the method comprising locating the microphone handle in the receiving slot or passage of the holder.

The holding portion may be substantially cylindrical, wherein the cover portion may be in the form of a sheet-like member having a first end attached or removably attachable to the holding portion along the length thereof and a second free end, and wherein the cover portion extends in a substantially curved or co-axial fashion to the holding portion and spaced therefrom so as to define the holding zone therebetween.

The holding portion may be cylindrical and the cover portion may be in the form of a planar and/or curved member attached or removably attachable to the holding portion by one or more attaching members, wherein the attaching members space the cover portion from the holding portion thereby to define the holding zone therebetween.

According to yet another aspect of the invention, there is provided a microphone accessory for use with a microphone comprising a head and a handle extending from the head, the microphone accessory having a body comprising:
  an attachment formation for attaching the microphone accessory to the handle of the microphone, in use;
  a holding portion to be engaged by a hand of a user, in use, wherein the holding portion is a wearable holding portion engageable by the hand of the user in a glove-like fashion;
  a cover portion coupled to the holding portion, wherein the cover portion substantially shields or covers the microphone handle and/or the hand of the user, in use; and
  at least one display and/or display device for displaying at least one communication selected from a group comprising a static display, an electronic display device, a holographic display device, and a projected display device, attached or removably attachable to the cover portion.

The cover portion may be in the form of a member being selected from the group comprising at least one of curved, deformable, reformable, planar, substantially planar, rounded, bendable, flexible, and/or rigid, semi-rigid, attached or removably attachable to the holding portion, where the cover portion substantially shields or covers the microphone handle and/or the hand of the user, substantially and/or in whole or in part, in use.

According to another aspect of the invention, there is provided a microphone handle or sleeve, and a cover or shield, with the cover or shield having at least at one display area. The display shield doubles as a hand shield, shielding the users hand from view, while simultaneously being used or employed as a display means for displaying at least one communication to an audience. The display shield may comprise at least one display zone. The display shield may be attached, permanently or removably, to the cover portion (or by using other suitable attachment means), and the cover portion in turn may be attached to the microphones handle, permanently or removably.

The invention as disclosed herein disclosed the system, means and methods to achieve the desired results of the problems identified herein.

The invention discloses preferred embodiments of the invention.

The invention will now be described by way of non-limiting examples only, with reference to the following drawings.

DRAWINGS

In the drawings:

FIG. 3 illustrates a microphone accessory in accordance with an example embodiment ready for attachment to a microphone handle;

FIG. 6 illustrates another example embodiment of a microphone accessory;

FIG. 15 illustrates a hand holding an example embodiment of a microphone accessory;

FIG. 16 illustrates an illustrative view of a display device displaying a scene of another example embodiment of a microphone accessory, in use, on a hand of a user;

Figure 18:
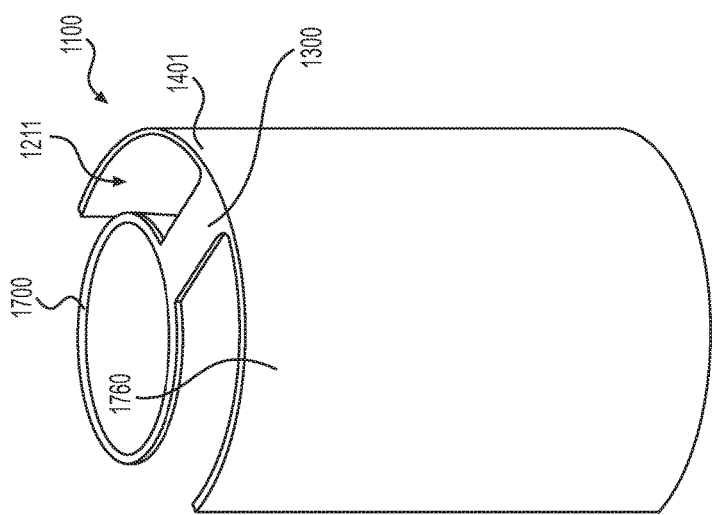
Figure 20:
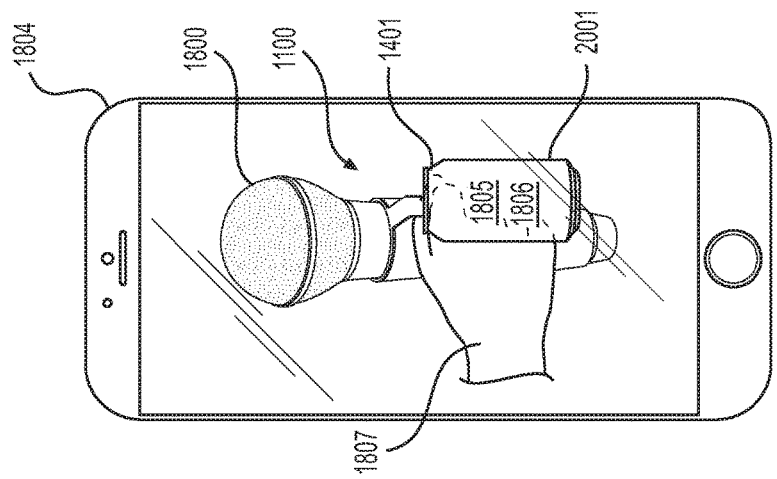
Figure 19:
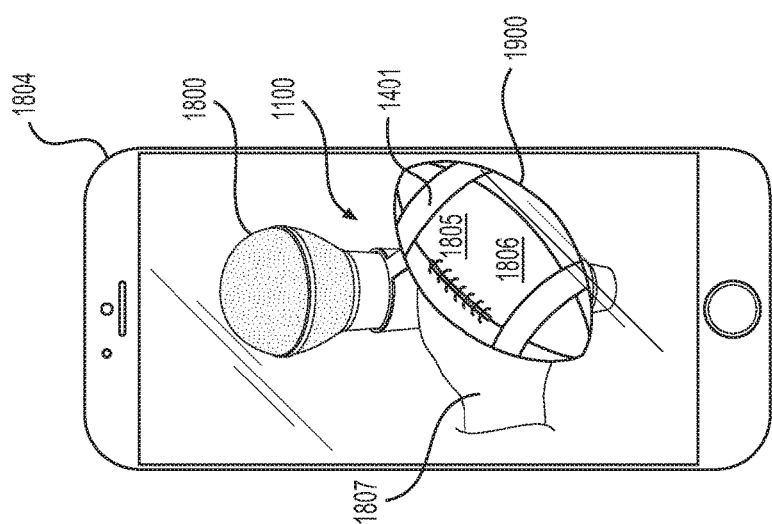

FIG. 18 illustrates another example embodiment of a microphone accessory ready for use on a microphone handle FIG. 19 illustrates an illustrative view of a display device displaying a scene of another example embodiment of a microphone accessory, in use, on a hand of a user; and FIG. 20 illustrates an illustrative view of a display device displaying a scene of another example embodiment of a microphone accessory, in use, on a hand of a user.

DETAILED DESCRIPTION OF THE INVENTION

The term "communication" as used herein means any indicia, marks, advertising, logo, 3D printed item, coupon, promotional message, symbols, digits, letters, words, symbol sets, representations and or any other physical form or forms representing information, whether permanent or temporary.

A communication may be an electronic communication displayed on an electronic display device and/or a communication may be a non-electronic or static communication.

A static communication may be displayed on and/or below the surface of a material such as paper, cardboard, plastic, vinyl, a wall, a painted surface, rubber, any combination of the preceding or any other suitable material/s.

A static communication may be removably or permanently attached to a surface of material/s. A static communication may be printed directly onto the static display zone and/or a static communication may be printed onto a second medium, such as paper and/or vinyl and/or vinyl paper and/or plastic and/or aluminium and/or metallized plastic and/or a plastic derivative or hybrid material, and attached, removably and/or permanently, to the static display zone, by various means, including adhesive, velcro, frictional engagement, magnetic attraction, and so on.

The term "transmitter" or "transmitted" as used herein means any device which transmits, radiates or distributes a signal, whether optical, video, filmed, radar, sonar, ultrasound, visual, infrared, acoustic, electric, magnetic, electromagnetic or otherwise manifested, whether digital and or analogue or otherwise manifested.

The term "receiver" or "received" as used herein means any device which acquires and or captures a signal(s) and or image(s) or a series of images (such as video images), whether visual, optical, radar, sonar, infrared, filmed, ultrasound, acoustic, electric, magnetic, electromagnetic or otherwise manifested, whether digital and or analogue or otherwise manifested. The receiver may use a photographic lens and associated imaging device(s) to capture images including images of vehicles and or people.

When used in appropriate context the term "device" means any transmitter and/or receiver. A device and/or display means may include an electronic display device configured to display at least one image or a plurality of images, and includes the necessary software, hardware, circuitry, power supply, data, data bases, input means, transmission and/or reception means, interface, and so on to display and/or use the identified data, a static display means including a display surface on which a communication may be displayed, directly or indirectly, by various suitable means including by printing onto the surface of the static display means and/or by attaching a second display means (such as paper with a communication displayed thereon to the surface of the display means using a suitable attachment means such as an adhesive) and/or by the display of at least one communication using an electro-mechanical display means, or other suitable communication display means. In addition, the term device refers to the type of device and/or display means described.

The term "image" includes a single image or a series of images, whether digital or analogue, whether on film or video.

In this specification "to film" or to "video" means to capture an image, or a sequence of images, in a suitable manner, including chemical, magnetic or optical, and either in analogue or digital form; and "filming" and "film" or "videod" and "video" (as a verb) have corresponding meanings. The filming or videoing of an image or a sequence of images may be achieved and or recorded by a camera. A camera includes recording the image of an object on a light-sensitive material or by a camera which is an electronic device for capturing images and converting them into electrical impulses (analogue and or digital) or by other suitable means.

The terms "coupled", "coupled to" and "coupled with" as used herein means a relationship between or among two or more devices, any means described herein, the accessory/ies described herein, apparatus, files, programs, media, components, materials, networks, systems, subsystems and or means, comprising any one or more of (a) a connection and/or attachment whether direct or indirect, permanent or removable, or through one or more other devices, apparatus, files, cables, wireless, programs, media, components, networks, systems, sub-systems or means, magnet, adhesive, friction, male-female coupling, clip, velcro, means of attachment, means of connection (b) a communications relationship, whether direct or indirect or through one or more other devices, apparatus, files, programs, media, components, networks, systems, sub-systems or means, or (c) a functional relationship in which the operation of any one or more thereof depends, in whole or in part, of the operation of any one or more others thereof. Moreover, for brevity, "coupled" refers to permanent attachment including integrally formed or removably attachable.

The term "processor" and or "processing" and or "controller" and or "controlling" as used herein means processing device(s), apparatus, programs, circuits, data, data bases, sensor/s, power supply, systems and sub-systems, whether implemented in hardware, software, circuitry or any combination thereof, and whether for processing analogue and/or digital data.

The term "data" as used herein means any indicia, signals, information, marks, binary data, symbols, digits, letters, words, domains, symbol sets, digital data, analogue data, representations and any other physical form or forms representing information, whether permanent or temporary, whether visible, audible, acoustic, electric, magnetic, electromagnetic, infrared, binary, radar, laser, optical or otherwise manifested. The term "data" as used herein to represent certain information in one physical form shall be deemed to encompass any and all representations of the same information in a different form or forms.

Figure 1:
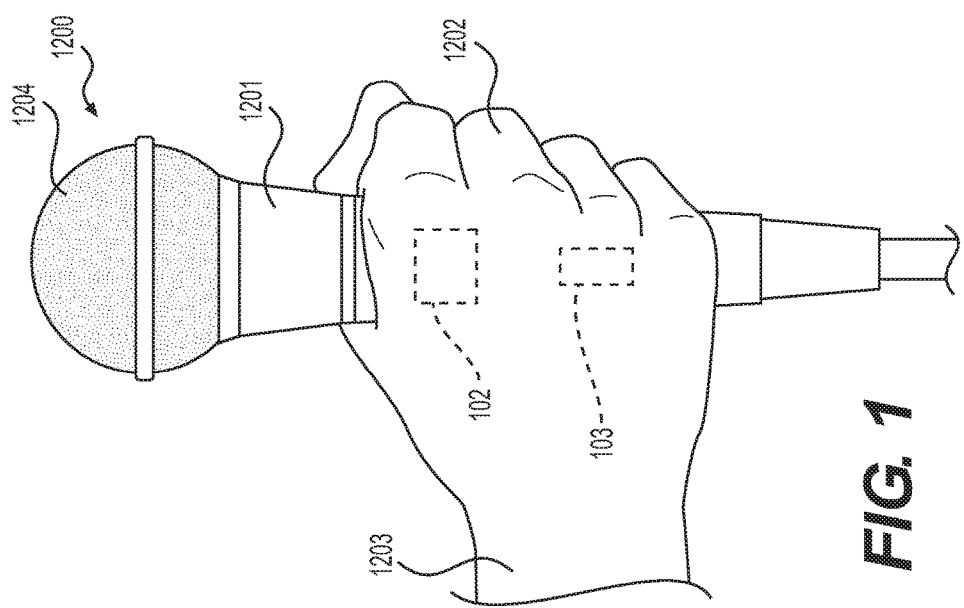
FIG. 1 illustrates a hand held microphone of the type configured for use with a microphone accessory in accordance with an example embodiment.

As illustrated in FIG. 1, microphone 1200 comprises a handle 1201 and a head 1204. The microphone 1200 is typically a hand-held microphone such that a user's hand 1202 grips the microphone's handle 1201. The user's wrist is illustrated by numeral 1203. As is clearly illustrated in FIG. 1, any display area 102 and/or any communication 103 attached to and/or displayed using microphone handle 1201 cannot be displayed as the user's hand 1202 obscures the display area 102 and/or the communication 103.

Figure 2:
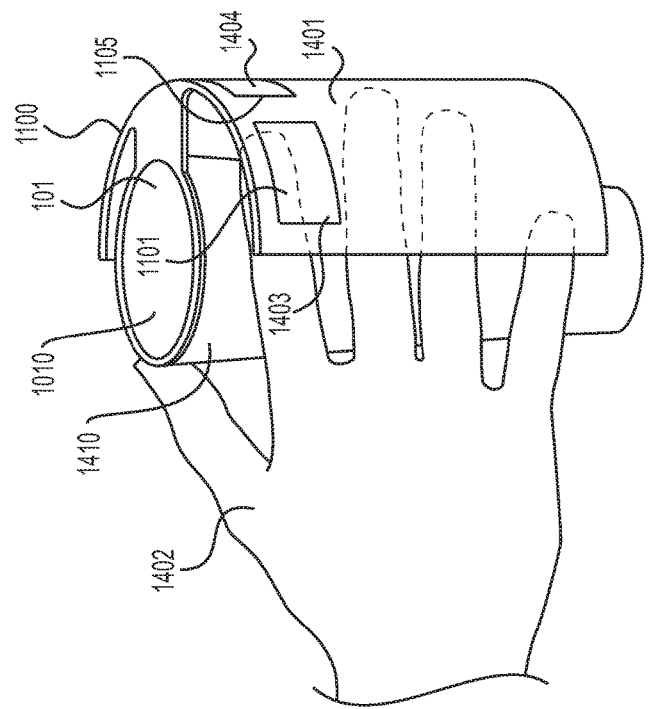
FIG. 2 illustrates a microphone accessory in accordance with an example embodiment.

As illustrated in FIG. 2, microphone accessory 1100 may include a cover portion 1401 and a holding portion 1410, where accessory 1100 may be configured so that a user's hand 1402 may slide under cover portion 1401 to a holding zone, thereby covering the hand 1402 of the user, while simultaneously allowing the microphone cover portion 1401 to display at least one communication, and simultaneously enabling a microphone's handle to be coupled or attached to, permanently or removably, holder portion 1410. For example, the microphone handle (not illustrated) may be inserted through aperture 101 of holder 1410 into the hollow body 1010 of holder 1410 to frictionally engage therewith.

Accordingly, at least one static communication zone 1101 and/or at least one dynamic communication zone 1105 may be visible to a viewer of static communication 1403 and/or dynamic communication 1404, while covering the user's hand 1402 so that the user's hand 1402 does not obstruct the view of static communication 1403 and/or dynamic communication 1404.

In a preferred embodiment of the invention, at least one electronically variable communication and/or a plurality of electronically variable communications may be viewed on the microphone cover portion 1401.

In a preferred embodiment of the invention, at least one static communication and/or a plurality of static of communications may be viewed on the microphone cover portion 1401.

In a preferred embodiment of the invention, at least one static communication and/or at least one electronically variable communication may be viewed on the microphone cover portion 1401.

As illustrated in FIG. 3, the microphone accessory 1100 comprises a holder 1410 for the handle 1201 of microphone 1200 and a display area 1231, with a gap 1211 or holding portion 1211 or holding zone 1211 between the holder 1410 and display area 1231 configured so that the user's hand 1202 may fit between the outer surface of the holder 1410 and the inner surface of the display area 1231, such that at least one communication (for example static communication 1215), may be displayed thereon, without the user's hand obscuring, partially or wholly, the communication displayed by display area 1231 on cover portion 1401. The holder 1410 may comprise an aperture 1232 at one end thereof, and a hollow area 1233, into which the microphone handle 1201 is inserted or recessed and housed. In a preferred embodiment, the microphone handle 1201 may be frictionally engaged in the hollow opening 1233 of the holder 1410, permanently or removably. The second end 1240 of the holder 1410 may comprise an opening such that the electronic circuitry 1242 or antennae 1243 and/or audio input attachments 1244 of the microphone 1200 remain free and unimpeded and may be attached to the microphone's 1200 audio cable/s, power cable/s, transmitters/receivers, power supply units and so on (not illustrated).

Holder 1410 may be shaped to conform to handle 1201 or holder 1410 may have a different shape to handle 1201. For example, holder 1410 may have a cylindrical shape such that it can substantially enclose and conform to handle 1201.

The holder 1410 and the cover portion 1401 may be made from any number of different materials. For example, holder 1410 and cover portion 1401 may be thick or thin, elastic, semi-elastic or inelastic, flexible, semi-flexible or rigid, and so on. Holder 1410 and cover portion 1401 may be made from various plastics, metals, metalized plastic, rubber, composites, meshes, PVC, aluminium, and so on.

Cover portion 1401 may be attached to the holder 1410, permanently or removably, and/or reversibly, for example, by using attachment formation 1300. Importantly, there is a holding portion 1211 between the cover portion 1401 and the holder 1410. A human hand and/or a non-human item, such as a stand and/or stem and/or stalk and/or microphone holding device (not illustrated) may grip or attach, permanently or removably, to the holder 1410 using the holding portion 1211 between the inner surface of the cover portion 1401 and the outer surface of the holder 1410.

The outer surface 1236 of the cover portion 1401 may comprise at least one display zone for displaying at least one communication. The cover portion 1401 simultaneously shields the user's hand 1202 from the view of a viewer/s and may also be configured to display at least one communication thereon. Should a user so desire, the cover portion 1401 may not display any communication thereon, but may be used to shield the user's hand 1202 for the view of a viewer/s. The cover portion 1401 may be filmed by camera 1240 and transmitted to an audience.

Cover portion 1401 may comprise at least one or a plurality (1215 and/or 1216 and/or 1214 and/or 1217 and/or 1218 and/or 1219 and/or 1220) of display zones and/or display means.

For example, cover portion 1401 may comprise static communication zone 1215 or static display 1215 for displaying a static communication. For example, a static communication may be printed directly onto cover portion 1401's static display zone 1215. Alternatively, display zone 1215 may be comprised of magnetized plastic and a static communication may be printed onto a magnet or magnetized paper (which may be bendable and/or flexible), which magnet or magnetized paper may then be attached to cover portion 1401, at communication zone 1215, which thereby displays the communication.

Display zone 1214 may display an electronically variable communication using an electronic display device such as a LCD or LED display or other electronic display device.

Electronic display device 1217 may be attached, permanently or removably, to cover portion 1401 and may display at least one electronically variable communication. For example, electronic display device 1217 may be magnetically attached to cover portion 1401. The accessory 1100 may comprise the necessary hardware, software, circuitry, memory, data input, storage means, transmitter/s and/or receiver/s, power supply and other equipment, collectively referenced by numeral 1212, to drive the electronic display device 1214 and/or 1217, in a wired 1213.1 and/or wireless 1213 manner, and/or the electronic display devices 1214 and/or 1217 may themselves comprise the necessary hardware, software, circuitry, memory, data input, storage means, transmitter/s and/or receiver/s, power supply and other equipment to drive their displays and to display at least one variable communication, in a wired and/or wireless manner.

A display device may be attached to the cover portion 1401, using a plurality of means, for example using opposing polarity magnets where, say, positive polarity magnets may be used on the display device and negative polarity magnets are used on the cover portion 1401 such that the opposed polarity magnets substantially align with one another so that the display device may be removably or permanently attached to the cover portion 1401, in the area or location desired by the user of the cover portion 1401.

Cover portion 1401 may be selected from the group comprising at least one of being curved and/or shaped and/or deformable and/or reformable and/or planar and/or substantially planar and/or rounded and/or bendable and/or flexible and/or rigid and/or semi-rigid and/or plastic and/or metallized plastic and/or rubber and/or composite material and/or nylon and/or PVC and/or acrylic, and so on.

A communication attached to cover portion 1401 may be selected from the group comprising at least one of static display and/or electronic display and/or electronically variable display and/or plastic display and/or paper display and/or vinyl display and/or magnetic display and/or vinyl paper display, and the like.

Microphone accessory 1100 may comprise an auditing unit or module, where display data, dates, times, durations, advertisers, and so on, may be stored locally for later retrieval or for real time transmission, either wirelessly or by wire, for auditing and/or interrogation and/or verification and/or billing purposes; a GPS receiver/transmitter unit or module; a licensing module; a decommissioning or enabling unit or module, and so on (not illustrated).

Figure 4:
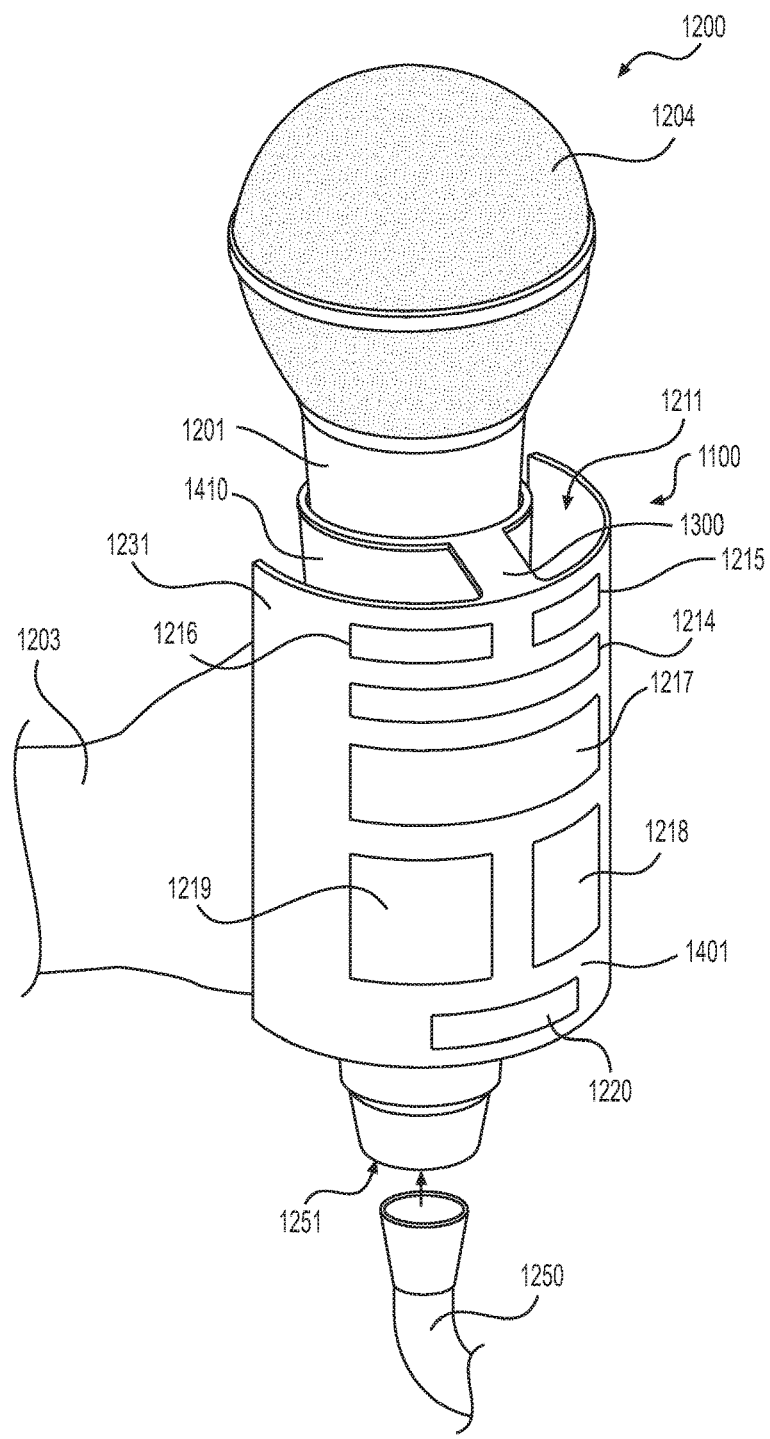
FIG. 4 illustrates a microphone accessory operatively attached to a hand held microphone, in accordance with an example embodiment.

As illustrated in FIG. 4, microphone 1200's handle 1201 is housed in accessory 1100's holder 1410 which substantially conforms to and may frictionally engage with microphone handle 1201. The microphone head 1204 is visible and usable for its intended purpose, including sound or audio pickup and transmission, recording, etc. Microphone cable 1250 may be attached to microphone 1200 through aperture 1251. Cover portion 1401 may simultaneously display at least one communication while shielding or hiding the user's hand 1203 from view. Cover portion 1401 may simultaneously be comprised of a plurality of communication zones or display zones (1215, 1216, 1214, 1217, 1218, 1219, 1220) while shielding or hiding the user's hand 1203 from view.

FIG. 4 illustrates the cover portion 1401 of accessory 1100 comprised of a plurality of display means, for example, including static displays 1215, 1216, 1214 and 1217; and electronically variable displays 1218, 1219 and 1220. The various displays may be of different shapes and sizes, as illustrated.

FIG. 4 further illustrates cover portion 1401 of accessory 1100 comprised of a plurality of display zones, including static display zones 1215, 1216, 1214 and 1217 and electronically variable display zones 1218, 1219 and 1220.

Figure 5:
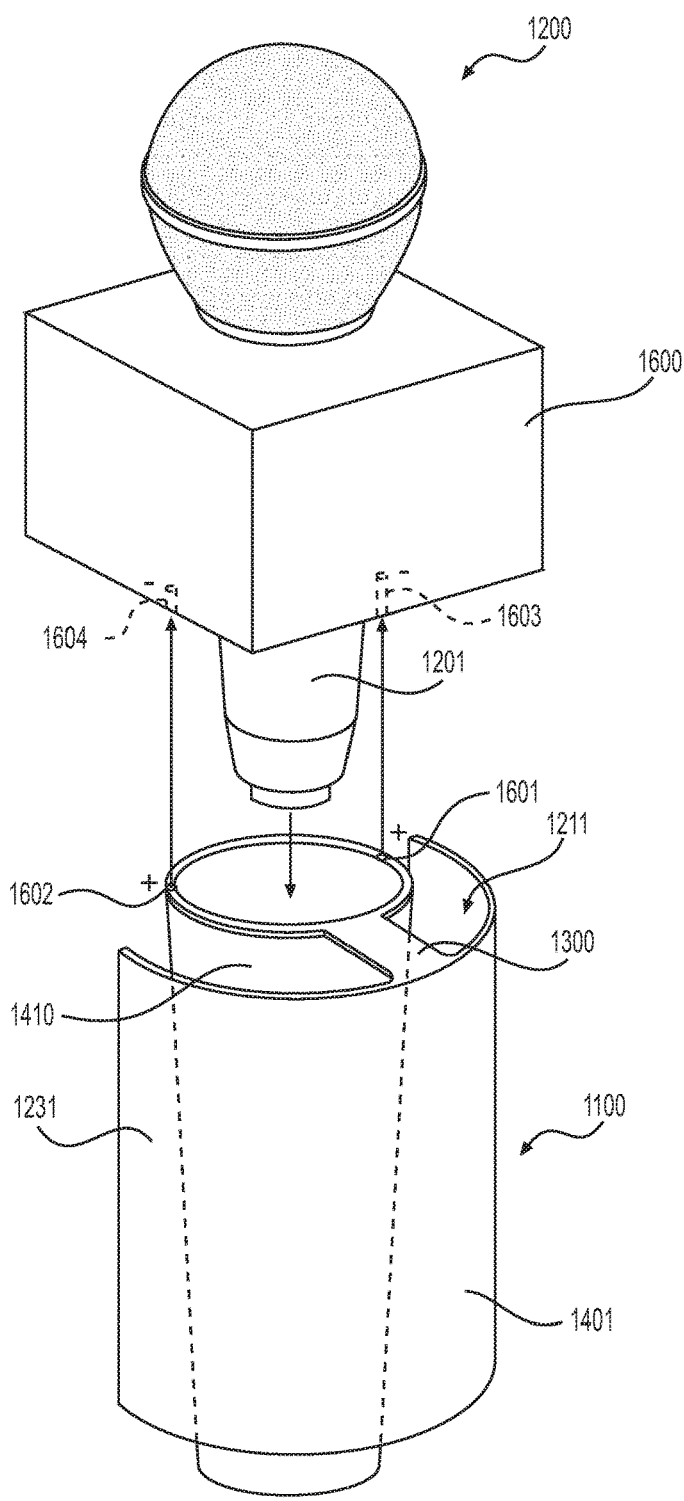
FIG. 5 illustrates a microphone accessory in accordance with an example embodiment, ready for attachment to a microphone handle having a microphone flag operatively attached thereto.

As illustrated in FIG. 5, microphone flag 1600 is attached to microphone 1200 and microphone handle 1201 protrudes from microphone flag 1600. Microphone handle 1201 may be inserted into handle 1410. Handle 1410, and cover portion 1401, may be attached to microphone flag 1600 using a plurality of means, permanently or removably.

Accessory 1100 may be attached to microphone flag 1600 using various means and/or methods, including adhesive, hooks and eyes, Velcro, and so on. In a preferred embodiment, microphone flag 1600 comprises at least one magnet or a plurality of magnets 1603 and 1604, and accessory 1100 comprises at least one magnet or a plurality of magnets 1601 and 1602 of opposite polarity to the magnets of microphone flag 1600, such that the magnets attract one another, thereby providing the means of attaching the accessory 1100 to microphone flag 1600, permanently or removably. The use of the magnets may be in addition to the frictional engagement of the microphone handle 1201 with the holder 1410 or independent thereof. The magnets may be attached, permanently or removably, to the cover portion 1401. Holder 1410 may comprise foam with within its hollow core, into which the microphone handle 1201 may be frictionally received and engaged (not illustrated).

Cover portion 1401 may be comprised of at least one display means which may be an electronically variable display screen, which may be curved and/or flexible and/or bendable and/or rounded, and so on. Cover portion 1401 may be comprised of one display means which may be an electronically variable display screen, which may be curved and/or flexible and/or bendable and/or rounded, and so on. Cover portion 1401 may be removably or permanently attached to holding portion 1300 using a plurality of means, for example magnets, clips, hinges and so on. Holding portion 1300 may be removably or permanently attached to holder 1410 using a plurality of means, for example magnets, clips, hinges and so on. Accessory 1100 and/or cover 1401 may comprise the necessary components, electronics, hardware, software, computers, receivers, transmitters, and so on (not illustrated), to enable cover portion 1401 to display at least one electronically variable communication.

As illustrated in FIG. 6, cover portion 1401 comprises an outer surface area 1700 which may be used for the display of least one communication, for example static communication 1701 which may be printed onto the outer surface area 1700.

Dynamic communication zone 1702 may be comprised of at least one electronic display device for the display of at least one electronically variable communication. Cover portion 1401 or accessory 1100 may comprise the necessary components, circuitry, hardware, software, memory, drivers, connectors, transmitters, receivers, computers, and so on, at 1703, so that at least one dynamic communication may be displayed using the electronic display device 1704 at dynamic communication zone 1702, either wirelessly or by wire.

In addition, device 1705 may transmit at least one communication to be displayed using electronic display device 1704, or by wire 1705.2 or wirelessly 1705.1, using the internet, wireless protocols, cellular systems, satellite and so on. Device 1705 may be a computer, media player, transmitter, receiver, transceiver, and so on. A communication may be synchronized between at least two electronic display devices, for example between electronic display devices 1704 and 1707, using display control device 1703, wired or wirelessly. Display control device 1703 may be permanently or removably attached to cover portion 1401 or to accessory 1100.

In a preferred embodiment, cover portion 1401 may be comprised of a bendable and/or rigid and/or substantially planar and/or flexible and/or foldable electronic screen and/or display and/or electronic display device and/or plastic and/or metallized plastic.

Figure 7:
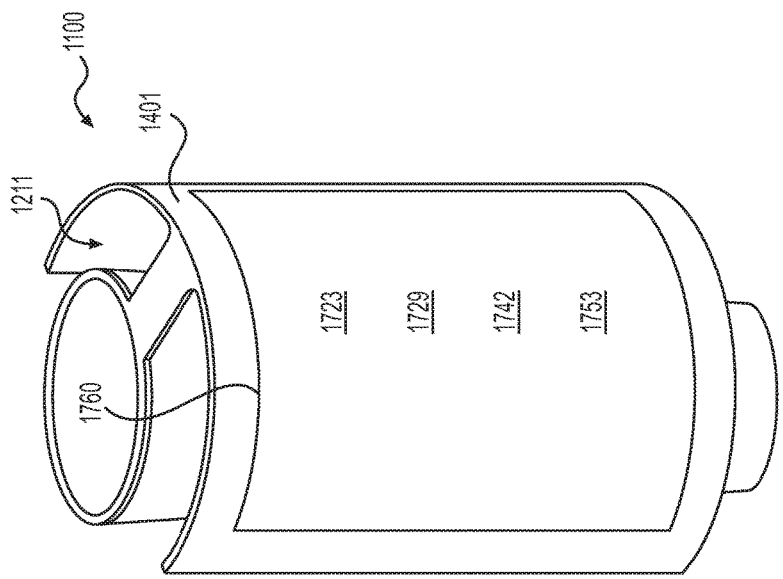
FIG. 7 illustrates another example embodiment of a microphone accessory.

FIG. 7 illustrates accessory 1100 with at least one display zone 1760 attached to cover portion 1401. Display means 1760 may display a plurality of communications 1723 and/or 1729 and/or 1742 and/or 1753.

The communication/s displayed by cover portion 1401 may be viewed using a plurality of devices, including television, mobile devices, tablet computers, mobile phones, laptop computers, desktop computers, and so on.

Figure 8:
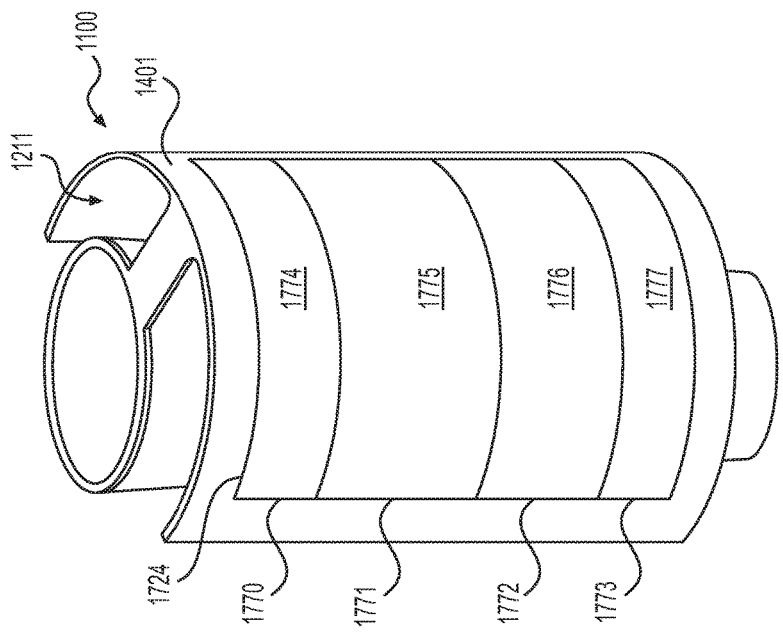
FIG. 8 illustrates another example embodiment of a microphone accessory.

As illustrated in FIG. 8, a plurality of adhesive-backed papers 1770, 1771, 1772 and 1773 may each have at least one communication 1774, 1775, 1776 and 1777, respectively, printed thereon, and the plurality of adhesive-backed papers 1770, 1771, 1772 and 1773 with their respective communications displayed thereon 1774, 1775, 1776 and 1777, may be adhesively attached (removably or permanently) to cover portion 1401.

Figure 9:
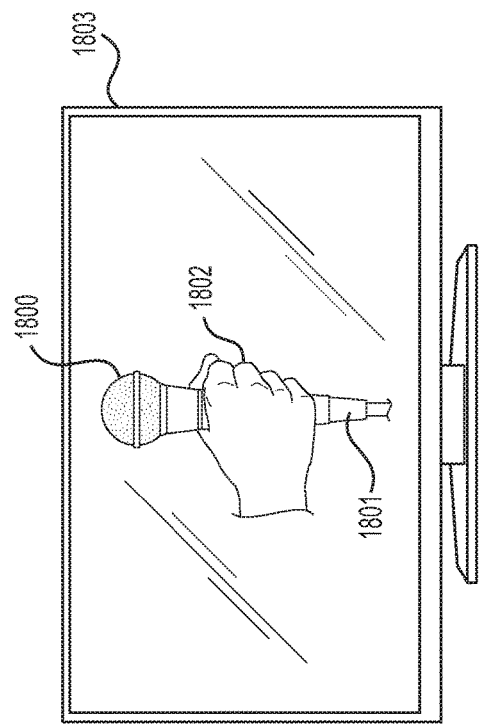
FIG. 9 illustrates an illustrative view of a display device displaying a scene of a hand held microphone, in use, with no microphone accessory attached.

As illustrated in FIG. 9, without using accessory 1100, any communication that may be displayed on the on the handle 1801 of a microphone 1800 may be blocked out or obscured or hidden from view, partially or wholly, by the hand 1802 of the holder of microphone 1800, as shown on television 1803. Significantly, a broadcaster or user of microphone 1800 may not be able to charge an advertiser for a communication displayed on the handle 1801 of microphone 1800 as the communication will not be visible to a viewer or an audience of viewers, thereby rendering the communication displayed on handle 1801 virtually worthless.

Figure 10:
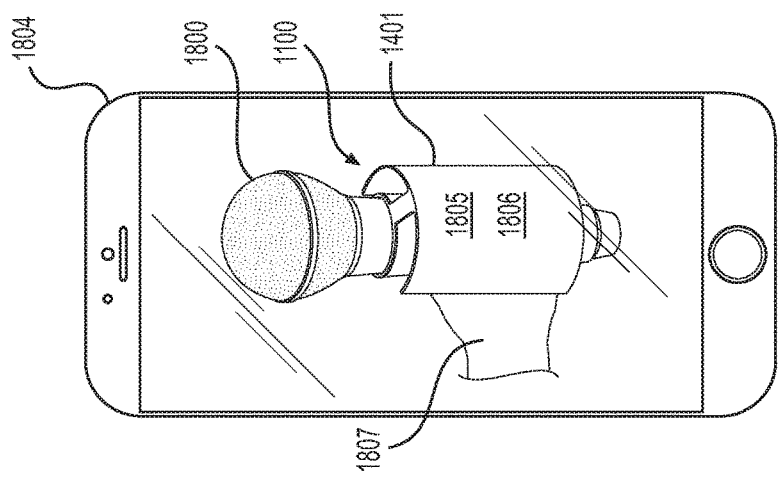
FIG. 10 illustrates another illustrative view of a mobile display device displaying a scene of a microphone accessory attached to a microphone.

As illustrated in FIG. 10, accessory 1100 has been filmed and transmitted, wirelessly and/or using wires, to mobile phone 1804 and is displayed on the screen thereof. Cover portion 1401 may display at least one communication 1805, or a plurality of communications, 1805 and 1806. Importantly, the users wrist 1807 only may be visible to a viewer, and the user's hand is not visible, as it is covered by cover portion 1401 which may simultaneously display at least one communication 1805 to at least one viewer. Significantly, as the cover portion 1401 may display a communication that may be communicated to a viewer or an audience of viewers, the broadcaster or transmitter of the communication may charge the communicator or advertiser a consideration for the communication, thereby creating value for the communication and an income stream for the broadcaster/transmitter, which income may not have been available to the broadcaster/transmitter without the use of accessory 1100. The communicator also benefits from the use of accessory 1100 as the communication is transmitted to, and reaches, an audience selected by, and valued by, the communicator.

Figure 11:
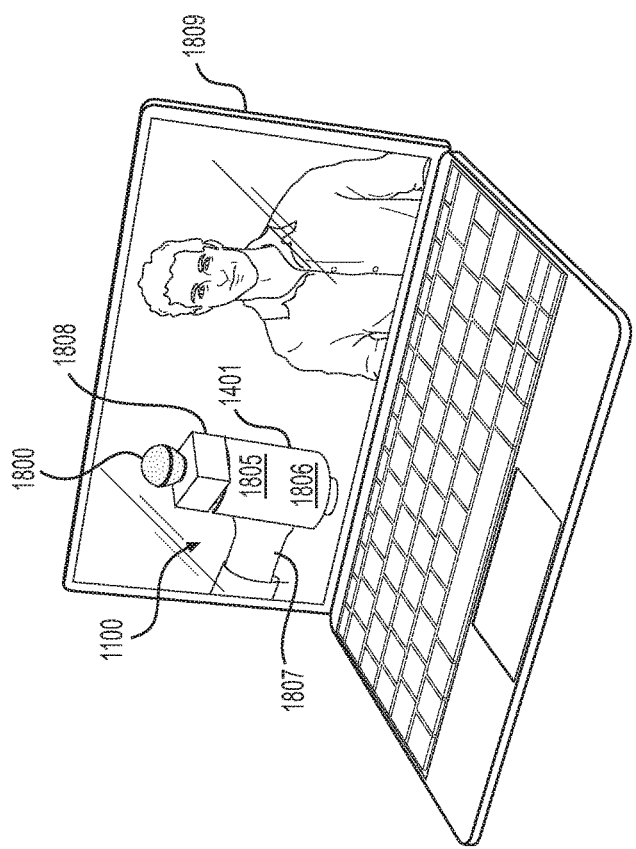
FIG. 11 illustrates another illustrative view of a display device displaying a scene of a microphone accessory and a microphone flag operatively in use on a microphone with a user holding same.

As illustrated in FIG. 11, accessory 1100 has been filmed and transmitted, wirelessly and/or using wires, to mobile or laptop computer 1809 and is displayed on the screen thereof. Cover portion 1401 may display at least one communication 1805, or a plurality of communications, 1805 and 1806. Importantly, the users wrist 1807 only may be visible to a viewer, and the user's hand is not visible, as it is covered by cover portion 1401 which simultaneously may display at least one communication 1806 to at least one viewer. Significantly, as the cover 1401 may display a communication that may be communicated to a viewer or an audience of viewers, the broadcaster or transmitter of the communication may charge the communicator or advertiser an amount for the communication, thereby creating value for the communication and an income stream for the broadcaster/transmitter, which may not have been available to the broadcaster/transmitter without the use of accessory 1100.

Figure 12:
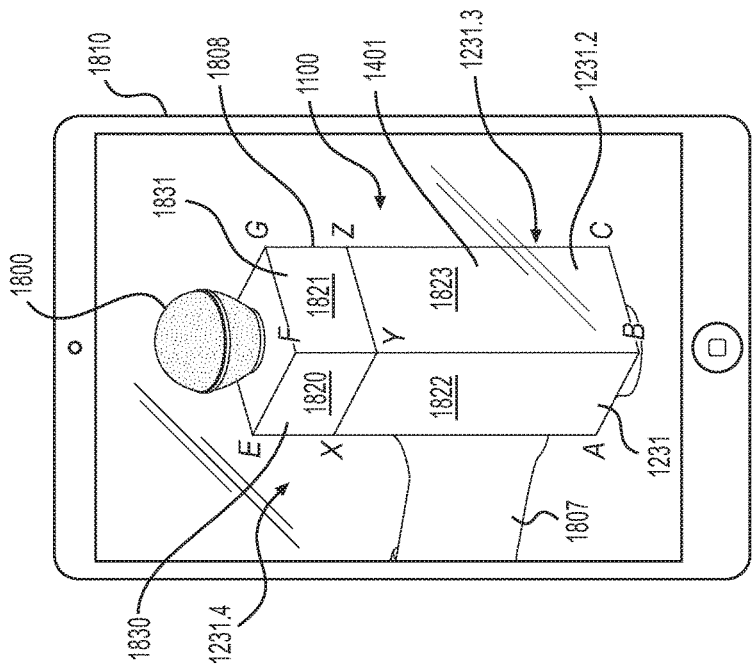
FIG. 12 illustrates another illustrative view of a display device displaying a scene of a microphone accessory attached to a microphone flag and to a microphone.

As illustrated in FIG. 12, the accessory 1100 may be used in conjunction with microphone flag 1808. Accessory 1100 may be attached to microphone flag 1808 or accessory 1100 may be contiguous to microphone flag 1808. Accessory 1100 and/or cover portion 1401 may be planar or substantially planar, curved, cylindrical, round or rounded, a slightly tapered cylinder, a truncated cone, square, oblong, triangular, elongated oblong, etc.

As further illustrated in FIG. 12, accessory 1100 is displayed using a tablet computer 1810. The user's wrist 1807 may be visible, but the user's hand is not visible behind the cover portion 1401. Microphone 1800 has attached thereto microphone flag 1808. Microphone flag 1808 may display at least one communication 1820 or a plurality of communications 1820 and 1821. Accessory 1100 may be attached, permanently or removably, to microphone flag 1808. Accessory 1100 may be substantially aligned with microphone flag 1808 and/or accessory 1100 may be substantially contiguous to microphone flag 1808 and/or accessory 1100 may be comprised of substantially the same perimeter dimensions as microphone flag 1808.

Accessory 1100 may comprise at least one cover portion 1231 or a plurality of cover portions 1231 and 1231.2 and 1231.3 and 1231.4, which may be permanently or removably attached thereto.

Accessory 1100 may comprise a microphone flag, which may be permanently or removably attached thereto.

Accessory 1100 may comprise at least one handle and at least one cover portion which may be permanently or removably attached thereto.

Accessory 1100 may comprise at least one handle and at least cover portion (which may be permanently or removably attached thereto) and at least one microphone flag (which may be permanently or removably attached thereto).

At least one communication, or a plurality of communications, may be displayed on accessory 1100's cover portion/s and/or microphone flag and such microphone flag communication/s may be synchronized, or not, with at least one communication, or a plurality of communications, displayed by at least one, or a plurality, of accessory 1100's cover portion/s, wired and/or wirelessly.

As illustrated in FIG. 12, the width of microphone flag 1808's first side may be the distance or length between point X and point Y, and the width of microphone flag 1808's second side may be the distance between point Y and point Z. In a preferred embodiment, the first side of cover portion 1231 may be configured to have the same size or distance or width as the width of the first side of microphone flag 1808, that is, the distance between point X and point Y. The height of the first side of cover portion 1401 may be the distance between point X and point A. The overall dimension or area of the first side of cover portion 1401 is the area X-A-B-Y.

The cover portion 1231.2 of accessory 1100 may be configured to have the same size or distance or width as the distance or width as the second side of microphone flag 1808, that is, the distance between point Y and point Z. The height of the second cover 1231.2 may be the distance between point Y and point B. The overall dimension or area of the second side of cover portion 1231.2 is the area Y-B-C-Z.

Accessory 1100 may be attached to microphone flag 1808, such that the display cover portions 1231, 1231.2, 1231.3 and 1231.4 are in substantial alignment with microphone flag 1808, as illustrated.

Microphone flag 1808 may display at least one communication or a plurality of communications. Microphone flag 1808 may display a first communication 1820 of the flag first side 1830 and a second communication 1821 on flag second side 1831.

First cover portion 1231 may display at least one communication 1822 or a plurality of communications. Second display shield 1231.2 may display at least one communication 1823 or a plurality of communications.

In such a preferred embodiment, accessory 1100, which may include the microphone flag 1808, displays four communications, 1820 and 1822 and 1821 and 1823. Alternatively, accessory 1100 may display communications 1822 and 1823.

Importantly, in a preferred embodiment, the size of a communication may be increased using accessory 1100, which is beneficial to the communicator and the broadcaster/transmitter, as the increased size of the communication makes the communication more visible to a viewer thereof and the broadcaster/transmitter may be able to charge a higher amount for the communication/advertisement displayed by accessory 1100.

For example, instead of displaying two separate communications, that is, first communication 1820 for product A on microphone flag 1808 and second communication 1822 for product B on cover portion 1231, the area X-Y-F-E of microphone flag 1808 may be combined with area X-A-B-Y of cover portion 1231, thereby creating a combined larger area E-A-B-F, where a larger communication/advertisement for, say, Product A or Product C may be displayed. Similarly, area Y-Z-G-F of microphone flag 1808 may be combined with area Y-B-C-Z of cover portion 1231.2, thereby creating a combined larger area F-B-C-G, where a larger communication/advertisement for, say, Product B or Product D may be displayed. In addition, area Y-Z-G-F and area X-Y-F-E of microphone flag 1808 may be combined with area Y-B-C-Z of cover portion 1231.2 and with area B-C-Z-Y of cover portion 1231.2, thereby creating a combined larger area E-F-G-C-B-A, where a larger communication/advertisement for, say, Product B or Product E may be displayed, and so on.

Figure 13B:
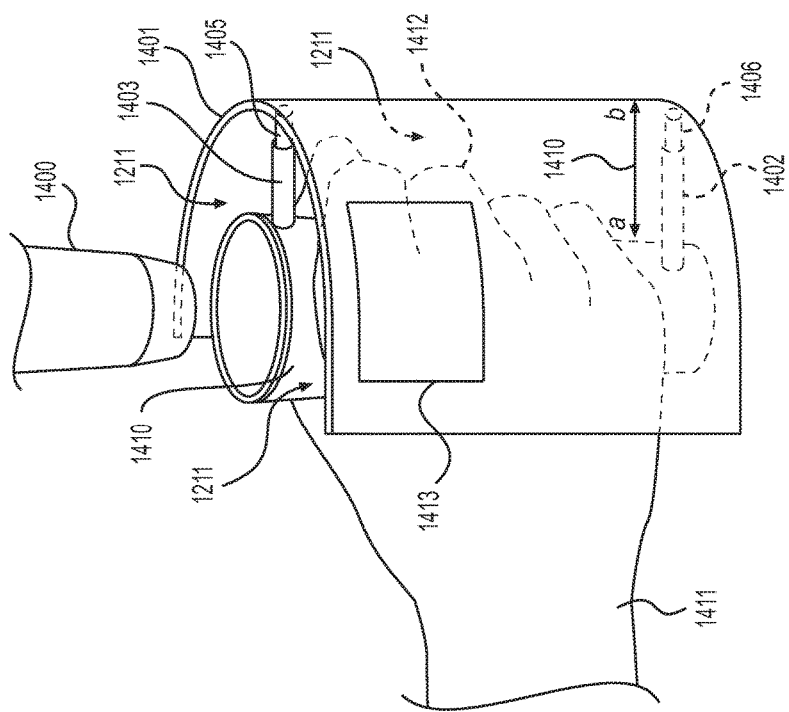
FIG. 13B illustrates another example embodiment of a microphone accessory ready for use on a microphone handle.
Figure 13A:
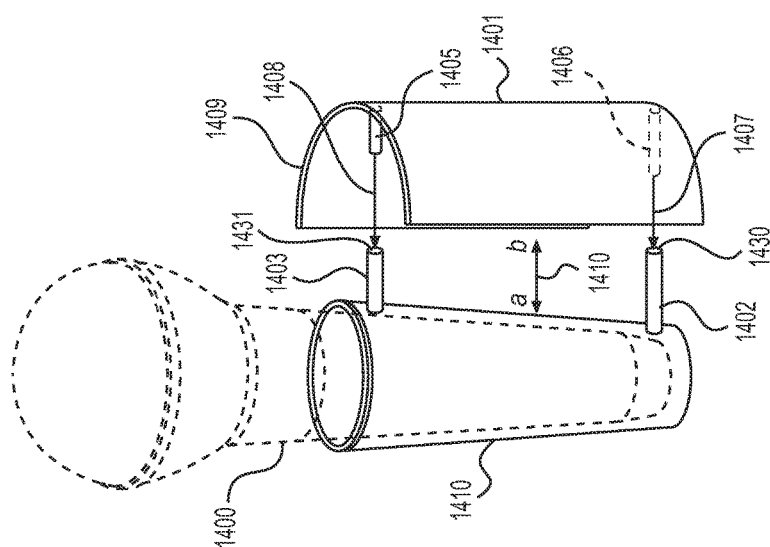
FIG. 13A illustrates another example embodiment of a microphone accessory.

As illustrated in FIG. 13A, microphone 1400 may be housed, permanently or removably, in holder 1410. Cover portion 1401 may be attached, permanently or removably, to holder 1410, using a plurality of attachment and/or detachment means. For example, in a preferred embodiment, holder 1410 may comprise, permanently or removably, at least one rod 1402 or a plurality of rods 1402 and 1403. Rods 1402 and 1403 may comprise an aperture 1430 and 1431, respectively, (female) into which the corresponding rods (male) 1406 and 1405, may be inserted using frictional engagement, or other suitable attachment and/or detachment means. Male rods 1406 and 1405, which may be permanently or removably attached to cover portion 1401, may be inserted into the female rods' 1402 and 1403, apertures' 1430 and 1431, respectively. The distance or length of the rods 1402 and 1403 may be the distance between points a and b, as illustrated. The distance a-b may be long enough to accommodate a human hand between the surface of the holder 1410 and the inner surface of the cover portion 1401. Cover portion 1401 may curve around to the back or rear of the microphone, as illustrated at 1409.

FIG. 13B illustrates rods 1405 and 1406 attached to rods 1402 and 1403, respectively, thereby joining holder 1410 to cover portion 1401, permanently or removably. Significantly, the distance a-b allows a users hand 1411 to fit between the cover portion 1401 and the holder 1410 and for the user's hand to grip the holder 1410 which contains the microphone's handle 1400. Cover portion 1401 may comprise at least one display zone 1413 for displaying at least one communication.

Figure 14:
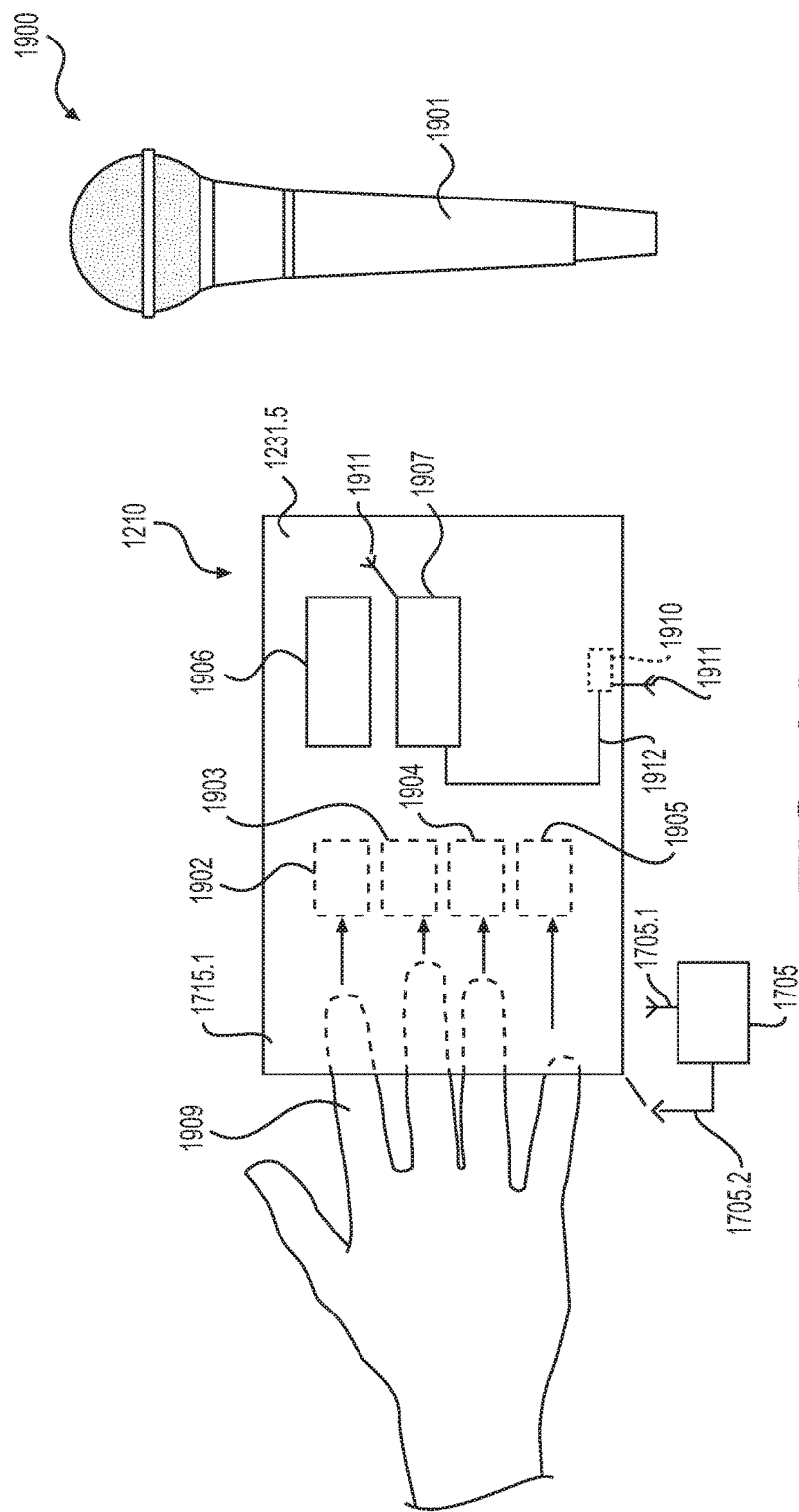
FIG. 14 illustrates another example embodiment of a microphone accessory for attachment to a microphone.

As illustrated in FIG. 14, in an alternative embodiment, an accessory 1210 comprises a cover portion 1231.5 and a holding portion, having engaging portions engagable by the hand, particularly fingers of a user, located on a reverse surface of the cover portion. In particular, the holding portion comprises at least one, or a plurality, of finger holders 1902, 1903, 1904 and 1905, on the reverse side or surface of cover portion 1231.5, into which the fingers 1909 of the user may be inserted in a glove-like fashion and is frictionally engaged and securely held. Though the fingers of the users hand may be located in the finger holders 1902, . . . , 1905, it will be understood that the fingers and hand of the user is still free to hold the microphone in a conventional fashion.

In this particular example embodiment, the holding portion may thus be attached to a reverse or rear surface of the cover portion.

Cover portion 1231.5 may include the communication zones, communication means, electronics, mechanics, motors, and so on, as has been disclosed herein. For example, cover portion 1231.5 may include at least one static communication display 1906, and/or at least one electronically variable display device 1907.

Cover portion 1231.5 may be comprised of at least one of being curved and/or deformable and/or reformable and/or bendable and/or rigid and/or substantially planar and/or flexible and/or foldable electronic screen and/or electronic display device and/or plastic and/or metallized plastic, and/or rubber and/or composite material and/or nylon and/or PVC and/or acrylic, and the like.

Dynamic communication zone 1907 may be comprised of at least one electronic display device for the display of at least one electronically variable communication. Cover portion 1231.5 may comprise the necessary components, circuitry, hardware, software, memory, drivers, connectors, transmitters, receivers, computers, and so on, at 1910, so that at least one dynamic communication may be displayed using the electronic display device 1907 at dynamic communication zone 1907, either wirelessly 1911 or by wire 1912.

In addition, device 1705 may transmit at least one communication to be displayed using electronic display device 1907, or by wire 1705.2 or wirelessly 1705.1, using the internet, wireless protocols, cellular systems, satellite and so on. Device 1705 may be a computer, media player, transmitter, receiver, transceiver, and so on. A communication may be synchronized between at least two electronic display devices, using display control device 1703, wired or wirelessly. Display control device 1703 may be permanently or removably attached to cover portion 1231.5.

As illustrated in FIG. 15, the user's hand and fingers 1909 are removably engageable with a holding portion having engaging formations or finger engaging formations in the form of finger holders 1902, 1903, 1904 and 1905. The finger holders 1902, . . . , 1905 may be located and attached or removably attachable on the operative rear or reverse side of cover portion 1231.5. In this way, holding portion may be engageable in a glove-like fashion by a human hand in a similar manner as described above with reference to FIG. 14. In other words, the user 1909 uses his or her hand to grip or hold the microphone handle 1901.

As illustrated in FIG. 16, the user's hand and fingers 1909 are not visible to a viewer of cover portion 1231.5 and at least one communication 1920 is visible to a viewer of display shield 1231.5, using display device 1921. Cover portion 1231.5 and communication 1920 may be filmed by camera 1922 and transmitted to an audience. Additional display means and/or zones, as disclosed herein, may be attached to cover portion 1231.5, permanently or removably (not illustrated).

Figure 17:
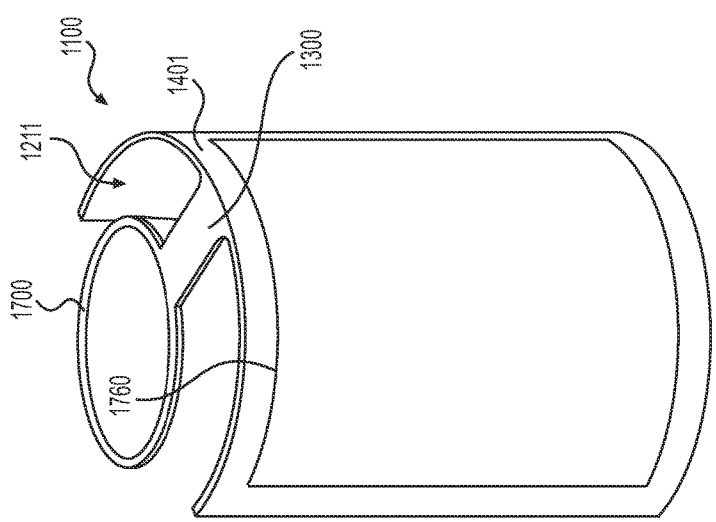
FIG. 17 illustrates a perspective view of another example embodiment of a microphone accessory.

As illustrated in FIG. 17, in alternative embodiment of accessory 1100, cover 1401 may be removably attachable or permanently attached to the handle of a microphone by way of an attachment formation comprising a ring-like clip 1700 through which the microphone handle (not illustrated) may be receivable, permanently or removably. The clip 1700 is substantially spaced from the cover portion 1401 via a spacer so as to provide a holding zone 1211 between an inner surface of the cover portion 1401 and the microphone handle, in use. The hand of a user (not shown) is receivable in the holding zone 1211 for engaging the microphone handle, in use.

The cover portion 1401 may be comprised of a plurality of materials such as plastic, metallized plastic, PVC and so on, and may display at least one communication 1760. In a preferred embodiment, display means 1760 may be an electronically variable display screen, which may be curved and/or flexible and/or bendable and/or rounded, and so on. Display means 1760 may be removably or permanently attached to cover 1401 using a plurality of means, for example, adhesive, magnets, Velcro, and so on.

Cover 1401 may be removably or permanently attached to holding portion 1300 using a plurality of means, for example magnets, clips, hinges and so on. Holding portion 1300 may be removably or permanently attached to clip 1700 using a plurality of means, for magnets, clips, hinges and so on. Accessory 1100 and/or display means 1760 may comprise the necessary components, electronics, hardware, software, computers, receivers, transmitters, and so on (not illustrated), to enable display means 1760 to display at least one electronically variable communication.

As illustrated in FIG. 18, in alternative embodiment of accessory 1100, cover 1401 may be removably or permanently attached, by way of an attachment formation in the form of a ring-like clip 1700. The clip 1700 may comprise a pair of part circular jaws which are biased to form a closed ring, wherein the jaws may be operated to attach to the microphone handle of various thicknesses, in use.

The holding zone 1211 is essentially provided between the cover portion 1401 and the microphone handle (not illustrated), in use, so that the users hand (not illustrated) may grip the microphone handle.

Cover portion 1401 may be comprised of at least one display means which may be an electronically variable display screen, which may be curved and/or flexible and/or bendable and/or rounded, and so on. Cover portion 1401 may be comprised of one display means which may be an electronically variable display screen, which may be curved and/or flexible and/or bendable and/or rounded, and so on. Cover portion 1401 may be removably or permanently attached to holding portion 1300 using a plurality of means, for example magnets, clips, hinges and so on. Holding portion 1300 may be removably or permanently attached to the clip 1700 using a plurality of means, for example magnets, clips, hinges and so on. Accessory 1100 and/or cover portion 1401 may comprise the necessary components, electronics, hardware, software, computers, receivers, transmitters, and so on (not illustrated), to enable cover portion 1401 to display at least one electronically variable communication.

As illustrated in FIG. 19, accessory 1100 has been filmed and transmitted, wirelessly and/or using wires, to mobile phone 1804 and is displayed on the screen thereof. Cover portion 1401 may comprise a variety of shapes and sizes, for example, cover portion 1401 may be shaped like a football 1900 or rugby ball 1900.

Cover portion 1401 may be selected from the group comprising at least one of being curved and/or shaped and/or deformable and/or reformable and/or planar and/or substantially planar and/or rounded and/or bendable and/or flexible and/or rigid and/or semi-rigid and/or plastic and/or metallized plastic and/or electronically variable display and/or rubber and/or composite material and/or nylon and/or PVC and/or acrylic, and so on.

Cover portion 1401 may be selected from the group comprising at least one of indicia and/or logo and/or trade mark and/or article and/or substance and/or product representation and/or 3D printed object and/or communication and/or design and/or image and/or device and/or object and/or logo and/or brand and/or advertisement and/or product and/or merchandise and/or trade mark and/or trade name, and so on.

Cover portion 1401 may display at least one communication 1805, or a plurality of communications, 1805 and 1806. Importantly, the users wrist 1807 may be visible to a viewer, and the user's hand may not visible, as it may be covered, substantially and/or in whole or in part, by cover portion 1401, which may simultaneously display at least one communication 1805 to at least one viewer.

Significantly, as the cover portion 1401 may display a communication that may be communicated to a viewer or an audience of viewers, the broadcaster or transmitter of the communication may charge the communicator or advertiser a consideration for the communication, thereby creating value for the communication and an income stream for the broadcaster/transmitter, which income may not have been available to the broadcaster/transmitter without the use of accessory 1100. The communicator also benefits from the use of accessory 1100 as the communication is transmitted to, and reaches, an audience selected by, and valued by, the communicator.

As illustrated in FIG. 120 accessory 1100 has been filmed and transmitted, wirelessly and/or using wires, to mobile phone 1804 and is displayed on the screen thereof. Cover portion 1401 may comprise a variety of shapes and sizes, for example, cover portion 1401 may be shaped like a beverage container 2001.

Cover portion 1401 may be selected from the group comprising at least one of being curved and/or shaped and/or deformable and/or reformable and/or planar and/or substantially planar and/or rounded and/or bendable and/or flexible and/or rigid and/or semi-rigid and/or plastic and/or metallized plastic and/or electronically variable display and/or rubber and/or composite material and/or nylon and/or PVC and/or acrylic, and so on.

Cover portion 1401 may be selected from the group comprising at least one of indicia and/or logo and/or trade mark and/or article and/or substance and/or product representation and/or 3D printed object and/or communication and/or design and/or image and/or device and/or object and/or logo and/or brand and/or advertisement and/or product and/or merchandise and/or trade mark and/or trade name, and so on.

Cover portion 1401 may display at least one communication 1805, or a plurality of communications, 1805 and 1806. Importantly, the users wrist 1807 may be visible to a viewer, and the user's hand may not visible, as it may be covered, substantially and/or in whole or in part, by cover portion 1401, which may simultaneously display at least one communication 1805 to at least one viewer.

Significantly, as the cover portion 1401 may display a communication that may be communicated to a viewer or an audience of viewers, the broadcaster or transmitter of the communication may charge the communicator or advertiser a consideration for the communication, thereby creating value for the communication and an income stream for the broadcaster/transmitter, which income may not have been available to the broadcaster/transmitter without the use of accessory 1100. The communicator also benefits from the use of accessory 1100 as the communication is transmitted to, and reaches, an audience selected by, and valued by, the communicator.

The field of the invention, background of the invention, summary of the invention and claims form an integral aspect of the description of the invention.

The invention claimed is:

1. A microphone accessory for use with a microphone comprising a head and a handle extending from the head, the microphone accessory having a body comprising:
   an attachment formation for attaching the microphone accessory to the microphone;
   a cover portion;

a suitable spacer attachable between the attachment formation and the cover portion so as to space the attachment formation from the cover portion thereby defining a holding zone between the cover portion and at least the handle of the microphone, wherein the cover portion is shaped and configured to substantially shield or cover the holding zone, and wherein the holding zone is engageable by a hand of a user, in use; and at least one display or display device for displaying at least one communication, wherein the at least one display or display device is selected from a group comprising a static display, an electronic display device, a holographic display device, a virtual reality device, a mixed reality device, an augmented reality device, and a projected display device, wherein the display or display device is attached or removably attachable to the cover portion or where the display or display device comprises the cover portion, in whole or in part.

2. A microphone accessory as claimed in claim 1, wherein the attachment formation comprises a suitable fastener to attach the accessory to the microphone, permanently or removably, and wherein the spacer spaces the cover portion from the fastener.

3. A microphone accessory as claimed in claim 1, wherein the attachment formation is configured to attach the accessory to one or both of the head and handle of the microphone.

4. A microphone accessory as claimed in claim 1, further comprising a holding portion attachable to the handle of the microphone and engageable by a hand of a user, in use, wherein the cover portion is coupled to the holding portion by the spacer to define the holding zone between the holding portion and the cover portion for receipt of the hand of the user to engage the holding portion, in use, such that the cover portion substantially shields or covers the holding zone or the hand of the user engaging the holding portion.

5. A microphone accessory as claimed in claim 4, wherein the attachment formation is in the form of a receiving slot or passage located in the holding portion for receiving the microphone handle axially therein wherein the receiving slot or passage is of a suitable shaped or dimension to receive the handle of the microphone axially therein.

6. A microphone accessory as claimed in claim 4, wherein the holding portion defines the attachment formation, in the form of a receiving slot of substantially cylindrical volume, axially therein in which the microphone handle is receivable, and wherein the cover portion is in the form of a sheet-like member having a first end attached or removably attachable to the holding portion along the length thereof and a second free end, and wherein the cover portion extends in a substantially curved or co-axial fashion to the holding portion and spaced therefrom so as to define the holding zone therebetween.

7. A microphone accessory as claimed in claim 1, wherein the cover portion is in the form of a two-dimensional or three-dimensional shape, and/or wherein the cover portion is in the form of or comprises a flat or curved or shaped display screen extending over at least a portion of an operative outer surface of the cover portion.

8. A microphone accessory as claimed in claim 1, wherein the accessory comprises flag engaging formations so as to be removably attachable to a microphone flag.

9. A microphone accessory as claimed in claim 4, wherein the holding portion has a shape selected from the group comprising at least one of cylindrical, round, rounded, tapered, tubular, and rod-shaped, and the cover portion is in the form of a member being selected from the group comprising at least one of curved, deformable, reformable, planar, substantially planar, rounded, bendable, flexible, rigid, semi-rigid, attached or removably attachable to the holding portion by one or more attaching members, wherein the attaching members space the cover portion from the holding portion thereby to define the holding zone therebetween.

10. A microphone accessory as claimed in claim 4, wherein the cover portion extends substantially the length of the holding portion and has a width selected so as to substantially cover the holding zone and/or the hand of the user, in use.

11. A microphone accessory as claimed in claim 1, wherein the attachment formation comprises a connection passage so as to receive suitable wiring connectable to the microphone handle.

12. A microphone accessory as claimed in claim 4, wherein the microphone accessory comprises engaging formations in the holding zone to facilitate the hand of the user engaging the holding portion.

13. A microphone accessory as claimed in claim 1, further comprising:
a power supply;
a data storage device storing media for display by the electronic display device and/or the holographic display device and/or the projected display device; and
a processor configured to control the electronic display device and/or the holographic display device and/or the projected display device to display the stored media.

14. A microphone accessory as claimed in claim 11, wherein the accessory comprises a wireless communication module configured to receive wireless signals indicative of media for display by the electronic display device and/or the holographic display device and/or the projected display device.

15. A microphone accessory as claimed in claim 1, wherein the spacer may comprise the attachment formation or the attachment formation may comprise the spacer.

16. A method of using a microphone comprising a head and a handle extending from the head, the method comprising displaying at least one communication via a device selected from a group comprising a static display, an electronic display device, a holographic display device, and a projected display device attached or removably attachable to a cover portion of a microphone accessory attachable to the handle of the microphone by way of an attachment formation for attaching the microphone accessory to the microphone, wherein the microphone accessory comprises a suitable spacer attachable between the attachment formation and the cover portion so as to space the attachment formation from the cover portion thereby defining a holding zone between the cover portion and at least the handle of the microphone, wherein the cover portion is shaped and configured to substantially shield or cover the holding zone, and wherein the holding zone is engageable by a hand of a user, in use.

17. A method as claimed in claim 16, wherein the attachment formation comprises a suitable fastener to attach the accessory to the microphone, permanently or removably, and wherein the spacer spaces the cover portion from the fastener, the method comprising operating the fastener to attach the accessory to the microphone.

18. A method as claimed in claim 16, wherein the attachment formation is configured to attach the accessory to one or both of the head and handle of the microphone, the method comprising operating the attachment formation to attach the accessory to one or both of the head and handle of the microphone.

19. A method as claimed in claim 16, wherein the accessory comprising a holding portion attachable to the handle of the microphone and engageable by a hand of a user, in use, wherein the cover portion is coupled to the holding portion by the spacer to define the holding zone between the holding portion and the cover portion for receipt of the hand of the user to engage the holding portion, in use, such that the cover portion substantially shields or covers the holding zone and/or the hand of the user engaging the holding portion.

20. A method as claimed in claim 19, wherein the attachment formation is in the form of a receiving slot or passage located in the holding portion for receiving the microphone handle axially therein wherein the receiving slot or passage is of a suitable shaped or dimension to receive the handle of the microphone axially therein, the method comprising locating the handle of the microphone axially in the holding portion so as to attach the accessory to the microphone.

\* \* \* \* \*